United States Patent Office 3,041,278
Patented June 26, 1962

---

3,041,278
METHOD OF PREPARING POLYVALENT METAL PETROLEUM SULFONATES AND MINERAL LUBRICATING OIL CONTAINING SAME
Paul D. Hobson, Concord, Calif., assignor to Shell Oil Company, a corporation of Delaware
No Drawing. Filed Mar. 10, 1959, Ser. No. 798,346
10 Claims. (Cl. 252—32.7)

The present invention relates to lubricants, improved additives therefor, and, more specifically, to an improved method for the preparation of oil-soluble polyvalent metal petroleum sulfonates.

Polyvalent metal petroleum sulfonates, particularly the alkaline earth metal petroleum sulfonates, such as calcium and barium petroleum sulfonates, are well-known detergents and rust inhibitors for lubricating oil compositions and other petroleum products. These sulfonates are usually prepared by reacting a suitable hydrocarbon, such as an alkylaryl hydrocarbon, a petroleum fraction such as a lubricating oil distillate fraction or a residue fraction, with a sulfonating agent such as concentrated sulfuric acid, mixtures of $SO_2/SO_3$, and the like. The oil-soluble sulfonic acids formed are removed from the sludge and green acids, and the sulfonic acids are generally neutralized with caustic, such as sodium or potassium hydroxide or carbonate, to form the alkali metal petroleum sulfonates which are extracted from the oil by suitable solvents such as aqueous alcohols. The sulfonates are recovered and dissolved in a solvent to remove inorganic impurities, which are discarded, and the solvent is removed by distillation, leaving a concentrate of 20% to 70% alkali metal petroleum sulfonates in oil. The alkali metal petroleum sulfonates are converted to the polyvalent metal petroleum sulfonates by double decomposition of the alkali metal petroleum sulfonates with polyvalent metal salts or bases such as chlorides, oxides, hydroxides, and/or carbonates of polyvalent metals such as the alkaline earth metals, e.g., calcium, barium, or zinc, as well as other polyvalent metals, e.g., lead, tin, chromium, and the like. The oil concentrate of the polyvalent metal petroleum sulfonate may be purified by various means and used as a lubricant, or added to a suitable oil to provide an oil of lower sulfonate concentration, or the sulfonate can be removed from the oil phase and used as oil additive for other oil compositions.

The oil-soluble polyvalent metal petroleum sulfonates can be prepared directly by reacting the oil-soluble sulfonic acids with a neutralizing amount of an aqueuos solution or suspension of an oxide, hydroxide, and/or carbonate of a polyvalent metal such as calcium, barium, lead, tin, or chromium. However, the direct method of neutralizing petroleum sulfonates presents difficulties of purification and the like, so that the double decomposition method for preparing polyvalent metal petroleum sulfonates is usually preferred.

Although polyvalent metal petroleum sulfonates prepared by the conventional method described above possess good detergent and rust-inhibiting properties, they tend to cause sludge, varnish, and lacquer deposits on various engine parts when used in lubricating oil compositions for the lubrication of engines subjected to operation under high temperatures and pressures.

It is an object of this invention to provide an improved oil-soluble polyvalent metal petroleum sulfonate composition. Another object is to provide an improved detergent and varnish-, lacquer-, and sludge-resistant oil-soluble alkaline earth petroleum sulfonate for use in lubricating oils subjected to high temperatures and pressures. Other objects will appear from the description of the invention.

According to the present invention, a process has been discovered by means of which oil-soluble polyvalent metal petroleum sulfonate concentrates having improved detergency and sludge-, lacquer-, and varnish-inhibiting properties can be prepared in an efficient manner. This is accomplished by sulfonating in a conventional manner, such as with concentrated sulfuric acid (85% or higher concentrate), a high molecular weight, low viscosity index petroleum raffinate fraction rich in aromatics and substantially free of sulfur containing materials; separating the sludge from the oil-soluble sulfonic acid oil concentrate, the sulfonic acid being present in the concentrate in an amount from 20% to 70% depending on the percent of aromatics present in the oil fraction being sulfonated; neutralizing the acid oil with an excess of caustic to convert the free sulfonic acids to the alkali metal sulfoantes, mixing one part of the alkali metal sulfonate oil concentrate with about one to about two parts of a high viscosity index petroleum oil distillate fraction, and treating the oil blend-sulfonate concentrate with an aqueous solution of a polyvalent metal salt or base such as an aqueous solution of an alkaline earth metal chloride, oxide, hydroxide, carbonate, and mixtures thereof, such as an aqueous mixture of alkaline earth metal chloride and hydroxide. The aqueous phase and inorganic impurities are removed by suitable means, such as evaporation, distillation, air-blowing, etc.

The sulfonatable high molecular weight low viscosity index petroleum raffinate fraction is a solvent (phenol, furfural, Edeleanu, etc.) petroleum raffinate which is aromatic rich (10% to 50%, preferably 20% to 40%), preferably polycyclics, such as di- and tri-aromatics which include alkyl polyaromatics such as di-, tri-, tetra-, and pentacycloalkyl naphthalenes, phenanthrenes, cycloalkyl phenanthrenes, which are substantially free of nitrogen- and sulfur-containing materials having an SUS viscosity at 100° F. in the range of 400 to 1000 and a Dean and Davis viscosity index of 30 to 60. Petroleum raffinate fractions of this type will be referred to as fraction X and typical raffinates of this type are petroleum raffinate from furfural solvent extracted fraction derived from a Poso/Coalinga California crude having the following properties:

| | |
|---|---|
| Viscosity SSV/100° F | 438 |
| Viscosity index | 55 |
| Sp. gr. $d_4^{20}$ | 0.8959 |
| Ref. ind. $n_d^{20}$ | 1.4889 |

Polyaromatic Analysis of the aromatic fraction by Mass Spectrometer:

| Nuclear Type | Amount (percent wt.) |
|---|---|
| (naphthalene) | 10.7 |
| (acenaphthylene / biphenyl) | 4.7 |
| (fluorene / acenaphthene) | 4.6 |
| (phenanthrene / anthracene) | 2.8 |
| (methylphenanthrenes) | 1.8 |
| (pyrene) | 2.4 |
| (chrysene) | 2.0 |
| Total Polyaromatics | 29.0 |

The high viscosity index oil distillate fraction is a refined distillate fraction having a viscosity index of at least 90, preferably 90–100, an SUS viscosity at 100° F. in the range of 100–600, and containing substantial proportions of heterocyclic aromatics such as sulfur-containing aromatics (10%–20%) such as benzothiophenes, dibenzothiophenes, thiophenacenaphthylenes, thiophenophenanthrenes, thiophenopyrenes, etc. A typical petroleum fraction will be referred to as fraction Y and such a fraction derived from an East Texas Crude has the following properties:

Viscosity SUS at 100° F_____ 250
Viscosity index_____ 90–95

Analysis (incremental ultraviolet absorption):
14% monoaromatics
21% polyaromatics, of which 13%–17% are diaromatics containing thiophenic structures, e.g., benzo and dibenzothiophenes
3% polar-containing resins
Essentially balance—Saturates.

According to the present invention, about one part of a petroleum oil concentrate of alkali metal petroleum sulfonate made from a low viscosity index (30–60 V.I.) high molecular weight petroleum raffinate fraction, containing 40%–60% of the sulfonate, is admixed with from about 1 to about 2 parts of a high viscosity index (90–95 V.I.) petroleum distillate fraction. This mixture of alkali metal petroleum sulfonate concentrate and high V.I. petroleum distillate is reacted with an amount of polyvalent metal compound, at least equal to one equivalent weight, based upon the amount of alkali metal petroleum sulfonate in the oil blend; the mixture is heated between 250° F. and 350° F. to complete the reaction. Impurities such as water and inorganic salts are eliminated by conventional means such as by solvent extracting, filtration, and air-blowing. The resultant product is a solution of the polyvalent metal petroleum sulfonate in a mixture of the petroleum oil raffinate and distillate fractions. The polyvalent metal petroleum sulfonate-oil blend concentrate thus produced can be further concentrated or modified by forming basic salts by treating the sulfonate concentrate with carbon dioxide. The sulfonates in the oil thus produced comprise from 20% to 60% of the concentrate and range in molecular weight from about 350 to 1000, preferably from 450 to 900.

The unusual properties which polyvalent metal petroleum sulfonates possess when made by the process of this inveniton are not clearly understood, particularly in view of the fact that it is desirable that prior to sulfonating the raffinate that any sulfur-containing materials be removed therefrom. Yet on converting the alkali metal sulfonate oil concentrate to the polyvalent metal salt, the alkali metal sulfonate concentrate is mixed with a distillate oil fraction containing sulfur compounds such as thiophenes. It may be surmised that during the formation of the polyvalent metal salt from such mixtures that some complexing or coordination compounds form between the polyvalent metal petroleum sulfonate and the thiophenes present in the petroleum distillate.

The following illustrative examples are given as specific embodiments of the invention.

EXAMPLE I

One part of a 60% sodium petroleum sulfonate–40% oil mixture derived from a 55 V.I. petroleum raffinate oil (18–30% aromatics) was mixed with one part of a 90–95 V.I. petroleum distillate fraction containing of the total aromatic 5–10% thiophene aromatics such as benzo- and dibenzothiophenes of the total aromatics. To the sulfonate oil blend concentrate was added an aqueous solution of calcium chloride and calcium hydroxide, the calcium chloride being in the predominant amount and in an amount sufficiently to completely convert the sodium sulfonate to calcium sulfonate, and the mixture was stirred and heated between 300° F. and 350° F. The water and inorganic impurities such as sodium chloride, hydrochloric acid, etc. were removed by air-blowing. The final product contained a 30% calcium petroleum sulfonate (M.W. 900) and suspended calcium hydroxide in a petroleum raffinate and petroleum distillate mixture rich in sulfur-containing aromatics.

Basic polyvalent metal petroleum sulfonates of this invention can be readily prepared by using an excess of 10% to 1000%, preferably 100% to 800% polyvalent metal oxide, hydroxide or carbonate or the like normally required to convert the alkali metal sulfonate to the polyvalent metal sulfonate or by carbon dioxide blowing a polyvalent metal petroleum sulfonate oil concentrate mixture as produced by the process of Example I.

EXAMPLE II

The procedure of Example I was followed, and the calcium petroleum sulfonate-oil blend was mixed with one part of a petroleum distillate fraction (90–95 V.I.) and treated with carbon dioxide for a period of time in an amount sufficient to convert 80%–90% of the calcium hydroxide to calcium carbonate. The product was heated to 200° F.–250° F. to remove water and filtered to obtain an oil blend concentrate of basic calcium petroleum sulfonate (180% excess base).

Other sulfonate-oil blend concentrates of this invention include barium petroleum sulfonate-oil blend concentrate, lead petroleum sulfonate-oil blend concentrate.

Calculated on the total oil composition, the sulfonate can be used in amounts of from 1% to 15%, preferably from 2% to 10%, based on the total oil composition; when the concentrate is used as a lubricant the sulfonate can be present in an amount of up to 70%.

When the sulfonates are used as oil additives, the oil base can be any suitable liquid hydrocarbon having lubrication properties. It may be a natural petroleum oil or some fraction thereof, such as liquid hydrocarbons boiling within the range of from about 150° F. to about 1000° F.

The superiority of polyvalent metal petroleum sulfonates of the present invention to polyvalent metal petroleum sulfonates made by conventional means is evidenced from the data presented in the following table:

*Table 1.—Engine Test Results*

| Composition | L-1 Supplement 1 Test (1% S Fuel) | | L-1 Test (480 hr., 0.4% S Fuel) | |
|---|---|---|---|---|
| | Piston Cleanliness Rating | Percent Carbon in Top Groove | Piston Cleanliness Rating | Percent Carbon in top groove |
| 1. Compounded lubricating oil composition containing 0.8% SA Ca petroleum sulfonate of Example I | a 99 | trace | a 95 | 12 |
| 2. Same as 1 except that a commercial Ca petroleum sulfonate (MW 450) was used | 95 | 35 | 93 | 25 |
| 3. Same as 1 except that in the preparation of the Ca petroleum sulfonate from a sodium salt the diluent was 30–50 V.I. mineral oil | 83 | 25 | 90 | 25 | a 100=perfect.

Buda spark ignition engines were operated for 40 days with mineral lubricating oils containing the additive of Example I(A) and a similar oil composition containing a commercial Ca petroleum sulfonate (B) and the change in viscosity at 100° F. SSU was observed for each lubricant as noted in Table II.

*Table II*

| Composition | 0 Days | 40 Days | |
|---|---|---|---|
| Composition A | 588 | 1,846 | Engine in good condition. |
| Composition B | 574 | 9,677 | Test discontinued after 37 days. |

A particularly useful application of polyvalent metal petroleum sulfonates of this invention is in their application as lubricant additives for free piston engines such as are described in Lubrication, September 1958. A composition C of this type comprises: 25% Ca petroleum sulfonate of Example I, 2.5% Ca salt of octyl phenolformaldehyde condensation product, 1.25% Zn di-2-ethylhexyl dithiophosphate, 0.20% phenyl-alpha-naphthylamine, 0.03% high molecular weight copolymer of methacrylate esters, and the balance being mineral oil distillate containing 6% bright stock. The properties of this composition C are as follows: viscosity SUS at 210° F., 96.3 viscosity index, 90; TBN–E, mg. KOH/g., 7.4. One of the more useful applications for lubricant of the invention is for diesel engines burning high sulfur (up to 7% wt.) residual type No. 5 and No. 6 fuels. Such a composition is 89.9% Ca petroleum sulfonates of Example II, 10% filtered bright stock, 0.5% $P_2S_5$ treated terpenes, 0.4% phenyl-alphanaphthyl amine. An example of this formulaton (D) and a similar formula was made with a commercial calcium petroleum sulfonate (E) run in a Caterpillar 1–F test engine gave the results shown in Table III.

*Table III*

| Composition | SSU at 100° F. | | | |
|---|---|---|---|---|
| | 0 Hours | 60 Hours | 70 Hours | 120 Hours |
| D | 1,303 | 2,046 | 2,500 | 4,830 |
| E | 461 | 2,413 | excess 5,000, test discontinued. | |

In spite of its initially higher viscosity, the 120 hour viscosity of composition D was actually lower than that of composition E at 70 hours.

Hydrocarbon compositions containing the sulfonates of this invention can contain other oil additives such as extreme pressure and anti-wear agents, preferably as thiophosphate esters and metal thiophosphates and metal phenates, antioxidants such as alkyl phenols and arylamines, e.g., phenyl-alpha-naphthylamine, polyacrylate esters viscosity index improvers, and the like.

Sulfonates of this invention and lubricants containing such sulfonates are particularly applicable for high temperature and extreme pressure use as in automotive engines, truck engines, Caterpillar engines, stationary turbine engines, and the like.

I claim as my invention:

1. A process for producing an improved polyvalent metal petroleum sulfonate mineral oil concentrate which comprises mixing an alkali metal petroleum sulfonate oil raffinate concentrate comprising 20–70% alkali metal petroleum sulfonate derived from a petroleum oil raffinate fraction having a viscosity of from 400 to 1000 SUS at 100° F. and a viscosity index of from 30 to 60 and being essentially free of sulfur and nitrogen constituents and containing 10–50% aromatics with from one to two parts of a high viscosity index petroleum distillate fraction the viscosity of which ranges from 100 to 600 SUS and the viscosity index being at least 90 and containing 10–20% sulfur-containing aromatics, treating said oil blend sulfonate concentrate with an aqueous solution of a polyvalent metal compound equal to at least one equivalent weight, based on the amount of alkali metal sulfonate in the oil blend so as to convert the alkali metal sulfonate to polyvalent metal petroleum sulfonate, and removing water and inorganic impurities from the polyvalent metal petroleum sulfonate-oil blend concentrate.

2. The process of claim 1 wherein the polyvalent metal compound is an alkaline earth metal compound.

3. The process of claim 1 wherein the alkali metal is sodium and the polyvalent metal compound is a calcium compound.

4. The process of claim 1 wherein the alkali metal is sodium and the polyvalent metal compound is a mixture of calcium chloride and calcium hydroxide.

5. A process for producing an improved calcium petroleum sulfonate by double decomposition which comprises mixing one part of sodium petroleum sulfonate oil concentrate comprising 40–60% sodium petroleum sulfonate derived from a petroleum raffinate fraction essentially free of sulfur and nitrogen constituents, having a V.I. of 30–60 and an aromatic content of 20–40% having a viscosity of from 400 to 1000 SUS at 100° F. and being aromatics with one part of a 90–95 viscosity index petroleum distillate fraction having a viscosity of from 100 to 600 and containing 10–20% sulfur-containing aromatics, treating said sulfonate-oil blend concentrate with at least one equivalent weight of an aqueous solution of calcium chloride and calcium hydroxide so as to convert the sodium petroleum sulfonate to calcium petroleum sulfonate at a temperature of 250–350° F., and removing the sodium chloride, water, and other impurities formed.

6. The product produced by the process of claim 5 treated with carbon dioxide.

7. A liquid hydrocarbon lubricating oil containing from 1% to 15% of the polyvalent metal petroleum sulfonate concentrate produced by the process of claim 1.

8. A liquid hydrocarbon lubricating oil containing from 1% to 15% of calcium petroleum sulfonate concentrate produced by the process of claim 5.

9. A liquid hydrocarbon lubricating oil containing from 1% to 15% of basic calcium petroleum sulfonate concentrate produced by the process of claim 6.

10. A mineral lubricating oil containing about 2.5% of basic calcium petroleum sulfonate concentrate produced by the process of claim 6, about 2.5% of calcium salt of octylphenol-formaldehyde condensation product, about 1.25% of zinc di-2-ethylhexyl dithiophosphate and about 0.20% phenyl-α-naphthylamine.

References Cited in the file of this patent

UNITED STATES PATENTS

| | | |
|---|---|---|
| 2,160,293 | Shoemaker et al. | May 30, 1939 |
| 2,258,806 | Pier et al. | Oct. 14, 1941 |
| 2,453,690 | Bray | Nov. 16, 1948 |
| 2,480,638 | Duncan et al. | Aug. 30, 1949 |
| 2,528,782 | Reiff et al. | Nov. 7, 1950 |
| 2,760,970 | Le Suer | Aug. 28, 1956 |
| 2,902,448 | Collins | Sept. 1, 1959 |

OTHER REFERENCES

Georgi: "Motor Oils and Engine Lubrication," 1950, Reinhold Publishing Corp., page 160.